(12) United States Patent
Van Der Lee et al.

(10) Patent No.: US 10,732,091 B2
(45) Date of Patent: Aug. 4, 2020

(54) LASER SENSOR FOR PARTICLE SIZE DETECTION

(71) Applicant: PHILIPS PHOTONICS GMBH, Ulm (DE)

(72) Inventors: Alexander Marc Van Der Lee, Eindhoven (NL); Joachim Wilhelm Hellmig, Eindhoven (NL); Johannes Hendrikus Maria Spruit, Eindhoven (NL)

(73) Assignee: TRUMPF PHOTONIC COMPONENTS GMBH, Ulm (DE)

( * ) Notice: Subject to any disclaimer, the term of this patent is extended or adjusted under 35 U.S.C. 154(b) by 370 days.

(21) Appl. No.: 15/746,470

(22) PCT Filed: Aug. 1, 2016

(86) PCT No.: PCT/EP2016/068270
§ 371 (c)(1),
(2) Date: Jan. 22, 2018

(87) PCT Pub. No.: WO2017/017282
PCT Pub. Date: Feb. 2, 2017

(65) Prior Publication Data
US 2018/0209892 A1 Jul. 26, 2018

(30) Foreign Application Priority Data

Jul. 30, 2015 (EP) .................................... 15179036

(51) Int. Cl.
*G01C 3/08* (2006.01)
*G01N 15/14* (2006.01)
(Continued)

(52) U.S. Cl.
CPC ..... *G01N 15/1434* (2013.01); *G01N 15/0205* (2013.01); *G01S 7/4802* (2013.01);
(Continued)

(58) Field of Classification Search
CPC .......... G01S 17/32; G01S 17/58; G01S 17/95; G01S 17/87; G01S 7/4802; G01S 7/4916; G01S 7/4817
(Continued)

(56) References Cited

U.S. PATENT DOCUMENTS 4,871,251 A 10/1989 Preikschat et al.
5,587,785 A 12/1996 Kato et al.
(Continued)

FOREIGN PATENT DOCUMENTS

CN 102519850 A 6/2012
CN 102565909 A 7/2012
(Continued)

OTHER PUBLICATIONS

Giuliani et al "Laser Diode Self Mixing Technique for Sensing Applications" Journal of Optical A: Pure and Applied Optics 2002, 4, S. P. 283-294.
(Continued)

*Primary Examiner* — Mark Hellner
(74) *Attorney, Agent, or Firm* — Leydig, Voit & Mayer, Ltd.

(57) ABSTRACT

The invention describes a laser sensor module (100) for particle size detection. The laser sensor module (100) comprises at least one first laser (110), at least one first detector (120), at least one electrical driver (130) and at least one evaluator (140). The first laser (110) is adapted to emit first laser light in reaction to signals provided by the at least one driver (130). The at least one first detector (120) is adapted to determine a first self-mixing interference signal (30) of an optical wave within a first laser cavity of the first laser (110). The first self-mixing interference signal (30) is caused by first reflected laser light reentering the first laser cavity, the first reflected laser light being reflected by a particle receiv-
(Continued)

ing at least a part of the first laser light. The evaluator (140) is adapted to determine a size of the particle by determining a first relative distance between the particle and the first laser (110) by means of the first self-mixing interference signal (30) and by determining a first amplitude information by means of the first self-mixing interference signal (30). The invention is further related to a corresponding method of determining a particle size.

20 Claims, 6 Drawing Sheets

(51) Int. Cl.
*G01S 17/58* (2006.01)
*G01N 15/02* (2006.01)
*G01S 7/48* (2006.01)
*G01S 17/87* (2020.01)
*G01S 7/4912* (2020.01)
*G01S 17/95* (2006.01)
*G01S 7/481* (2006.01)
*G01S 17/08* (2006.01)
*G01N 15/00* (2006.01)
*G01N 15/10* (2006.01)

(52) U.S. Cl.
CPC .......... *G01S 7/4817* (2013.01); *G01S 7/4916* (2013.01); *G01S 17/08* (2013.01); *G01S 17/58* (2013.01); *G01S 17/87* (2013.01); *G01S 17/95* (2013.01); *G01N 2015/03* (2013.01); *G01N 2015/1075* (2013.01); *G01N 2015/1438* (2013.01); *G01N 2015/1452* (2013.01); *G01N 2015/1454* (2013.01); *G01N 2015/1493* (2013.01); *Y02A 90/19* (2018.01)

(58) Field of Classification Search
USPC ....................................................... 356/5.01
See application file for complete search history.

(56) References Cited

U.S. PATENT DOCUMENTS

| | | | |
|---|---|---|---|
| 5,946,092 | A | 8/1999 | Defreez et al. |
| 6,111,642 | A | 8/2000 | Defreez et al. |
| 8,982,336 | B2 | 3/2015 | Ueno |
| 2008/0204698 | A1 | 8/2008 | Rohner et al. |
| 2009/0279070 | A1* | 11/2009 | Ueno .................... G01S 7/4915 356/28.5 |
| 2009/0323061 | A1 | 12/2009 | Novotny et al. |
| 2011/0007299 | A1 | 1/2011 | Moench et al. |
| 2012/0242976 | A1* | 9/2012 | Lepaysan ................. G01P 5/26 356/28.5 |
| 2014/0132943 | A1* | 5/2014 | Chou .................... G01N 21/49 356/28.5 |
| 2014/0226158 | A1 | 8/2014 | Trainer |
| 2015/0077735 | A1 | 3/2015 | Zamama et al. |

FOREIGN PATENT DOCUMENTS

| | | |
|---|---|---|
| CN | 102792183 A | 11/2012 |
| CN | 103528511 A | 1/2014 |
| CN | 104713473 A | 6/2015 |
| WO | 0237410 A1 | 5/2002 |

OTHER PUBLICATIONS

Sudo et al "Quick and East Measurement of Particle Size of Brownian Particles and Planktonin Water Uwing a Self Mixing Laser" Optics Express, vol. 14, No. 3, Feb. 6, 2006,—p. 1044-1054.
Acket et al "The Influence of Feedback Intensity on Longitudinal Mode Properties and Optical Noise in Index-Guided Semiconductor Lasers" IEEE Journal of Quantum Electronics, vol. QE-20, No. 10, Oct. 1984, p. 1163-1169.

* cited by examiner

LASER SENSOR FOR PARTICLE SIZE DETECTION

CROSS-REFERENCE TO PRIOR APPLICATIONS

This application is the U.S. National Phase application under 35 U.S.C. § 371 of International Application No. PCT/EP2016/068270, filed on Aug. 21, 2016, which claims the benefit of EP Patent Application No. EP 15179036.7, filed on Jul. 30, 2015. These applications are hereby incorporated by reference herein.

FIELD OF THE INVENTION

The invention relates to a laser sensor or laser sensor module for particle size detection, a related method of particle size detection and a corresponding computer program product.

BACKGROUND OF THE INVENTION

US 2014/0226158 A1 discloses systems and methods which analyze light to determine the size and characteristics of particles. The described systems and methods are complicated and expensive.

U.S. Pat. No. 4,871,251 discloses an apparatus for analyzing particles contained in a fluent medium. The apparatus includes a body having a window, an optical source preferably comprising a laser diode having a small light emitting area, and an optical system for focusing the light from the laser diode at a focal spot such that the size of the focal spot is approximately equal to the size of the light emitting area of the laser diode. A photodetector is mounted in the body and detects light backscattered from the focal spot by particles in the fluent medium, and produces an electrical signal that comprises a series of pulses associated with the particles. The electrical signal is input to a detector that counts the pulses and indicates the number of particles in the fluent medium.

SUMMARY OF THE INVENTION

It's thus an object of the present invention to provide a simpler and cheaper laser sensor module for particle size detection.

According to a first aspect a laser sensor module for particle size detection is presented. The laser sensor module comprises at least one first laser, at least one first detector at least one electrical driver and at least one evaluator. The first laser is adapted to emit first laser light in reaction to signals provided by the at least one driver. The at least one first detector is adapted to determine a first self-mixing interference signal of an optical wave within a first laser cavity of the first laser. The first self-mixing interference signal is caused by first reflected laser light reentering the first laser cavity. The first reflected laser light is reflected by a particle receiving at least a part of the first laser light. The evaluator is adapted to determine a size of the particle by determining a first relative distance between the particle and the first laser by means of the first self-mixing interference signal and by determining a first amplitude information by means of the first self-mixing interference signal.

The relative distance between the particle and the first laser may be directly determined or indirectly. A direct determination may be related to modulated laser light and an indirect determination may be related to an optical configuration as described in detail below. First amplitude information comprises all information which can be derived from the first self-mixing interference signal which is essentially related to the size of the particle. The size of the particle determines the amount of first laser light which is reflected by the particle.

In addition the distance between the first laser and particle influences first amplitude information which can be extracted from the first self-mixing interference signal. Furthermore, a divergence of the first laser light beam at the position of the particle influences the first reflected laser light entering the first laser cavity of the first laser. The first self-mixing interference signal is, for example, influenced if first laser light is focused and the particle is out of focus. First amplitude information may comprise the maximum and/or minimum amplitude of the first self-mixing interference signal. Alternatively, the first self-mixing interference signal may be used to determine, for example, an envelope of the measured first self-mixing interference signal. The maximum and/or minimum amplitude of the envelope may be comprised by the first amplitude information. The maximum and/or minimum amplitude of the envelope may be different as the maximum and/or minimum of the first self-mixing interference signal.

The first laser may preferably be adapted to emit laser light with wavelength above 750 nm in the infrared range of the spectrum, most preferably between 780 nm and 1300 nm of the wavelength spectrum.

The first laser may be a semiconductor laser as side emitter or a Vertical Cavity Surface Emitting laser (VCSEL).

The laser sensor module may be part of a particle detector which may be used to determine air quality. Such a particle detector may, for example, be integrated in mobile devices especially in mobile communication devices. The laser sensor module may be a separate device which can be integrated, for example, in mobile devices or at least a part of the functions of the laser sensor module may be performed by means of the infrastructure provided by the mobile device. Especially all or part of the functionalities of the evaluator may be provided by means of one or more processors of the mobile device. Software code may be stored in the storage device of the mobile device in order to enable, for example, at least a part of the functionalities of the evaluator.

The laser sensor module may comprise at least one first focus region. The first relative distance is related to a distance between the first focus region and the particle and the distance between the first laser and the first focus region which is determined by the optical characteristic of the laser sensor module. The evaluator is adapted to determine the first relative distance based on at least one characteristic of the first self-mixing interference signal being related to the distance between the first focus region and the particle, and wherein the first amplitude information comprises a maximum or minimum amplitude of the first self-mixing interference signal.

The first focus region may comprise a beam waist within the laser cavity or alternatively a first focus region outside the laser. The beam waist can be used as first focus region in cases in which the laser sensor module is arranged such that particles cross the first laser light near to an exit window of the first laser meaning near to the surface of one of the mirrors forming the first laser cavity. The relative distance may in this case be the distance between the beam waist within the first laser cavity and the particle minus the distance between the beam waist and the exit window.

The laser sensor module may alternatively or in addition comprise at least one first optical device for focusing the first laser light to the first focus region. The proposed method enables to determine the size of the particle even if the particle is out of focus. The distance between the first focus region and the particle is called defocus. The relative distance between the first laser and the particle is given in this case by the sum of the distance between the first laser and the first focus region and the distance between the first focus region and the particle (algebraic sign has to be taken into account). The amount of defocus (i.e. the curvature of the wavefront, in combination with the broadening of the amplitude of the beam) of the first laser light at the point of the particle can be calculated using information on the first optical device used in the system. The first optical device may comprise a single lens but also two, three or more lenses or lens arrangements. Furthermore, a lens with adaptable focus may be used in such a first optical device. The first focus region may be point like but can alternatively also comprise a defined focus depth. The diameter or more general cross-section of the focus may, for example, be essentially constant within a defined period along an optical axis of the first laser and the first optical device. The first focus region may, for example, have a circular or an elliptical cross-section.

The at least one characteristic of the first self-mixing interference signal being related to the distance between the first focus region and the particle may comprise phase information, number of oscillations, number of relative maxima or minima, ratio of amplitudes of relative maxima minima, number of zero crossings within a defined interval of the first self-mixing interference signal, one or more distances between the zero crossings and shape of an envelope of the first self-mixing interference signal. The first relative distance meaning the relative distance between the first laser and the particle strongly influences the characteristics or shape of the oscillations of the first self-mixing interference signal. The phase information, number of oscillations, number of relative maxima or minima, ratio of amplitudes of relative maxima minima number of zero crossings within a defined interval of the first self-mixing interference signal, one or more distances between the zero crossings and shape of an envelope of the first self-mixing interference signal is taken from a defined part of the first self-mixing interference signal. The number of oscillations and/or the non-uniform time spacing of the zero crossings of the first self-mixing interference signal may be used to determine the size of the particle. The size of the part of the first self-mixing interference signal may depend on the absolute maximum of the amplitude and the noise level of the first self-mixing interference signal. A fit to the theoretically expected intensity behavior for a particle that moves relatively to the spatial defocus field, would yield sufficient information in order to determine the size of the particle. The measured first self-mixing interference signal may be fitted to a theoretically expected curve wherein at least one of the phase information, number of oscillations, number of relative maxima or minima, ratio of amplitudes of relative maxima minima number of zero crossings within a defined interval of the first self-mixing interference signal, one or more distances between the zero crossings and shape of an envelope of the first self-mixing interference signal may be used. Wavelet type of analysis or neural networks with accordingly adapted algorithms may be used in order to perform fitting of the measured first self-mixing interference signal.

The evaluator may be adapted to determine an absolute maximum or minimum of a first signal amplitude of the first self-mixing interference signal. The evaluator may be adapted to determine a first number of relative maxima or minima of the first self-mixing interference signal within a defined range around the absolute maximum or minimum of the first self-mixing interference signal. The evaluator may be adapted to determine the first relative distance to the particle by means of the number of maxima or minima of the first self-mixing interference signal within the defined range. The evaluator may be further adapted to determine the size of the particle by means of the determined first relative distance to the particle and the absolute maximum or minimum of the first signal amplitude of the first self-mixing interference signal.

The first self-mixing interference signal may comprise a conventional Doppler frequency, a phase due to optical path between the first laser and the particle (this can also be influenced due to off axis rotation of the beam which may be caused, for example, by a scanning minor), and a spatial phase profile due defocus of the beam. The spatial phase profile is used in order to determine the size of the particle. The other effects as, for example, the Doppler frequency may either be determined by alternative measurement or its effect may be negligible, for example, in the sense that the Doppler frequency is lower than that due to the defocus effect. This could, for example, be achieved by fast spot movement or induced fast particle movement perpendicular to the beam of the first laser light compared to the velocity parallel to the beam of the first laser light.

The evaluator may be adapted to refine determination of the first relative distance to the particle based on the ratio between the absolute maximum of the first signal amplitude of the first self-mixing interference signal and an amplitude of the first self-mixing interference signal at at least one of the relative maxima of the first self-mixing interference signal, or based on the ratio between the absolute minimum of the first signal amplitude of the first self-mixing interference signal and an amplitude of the first self-mixing interference signal at at least one of the relative minima of the first self-mixing interference signal. The relative maxima or minima of the first self-mixing interference signal may be directly used in order to determine the decay of the signal relative to the measured absolute maxima or minima. Alternatively, the absolute maximum and minimum in combination with the relative maxima and minima of the self-mixing interference signal may be used to model or fit and envelope function to the measured signals which mathematically describes the decay of the signal. The decay of the first self-mixing interference signal may be analyzed in a range around the absolute maximum or minimum in which the signal is higher than a noise level of the self-mixing interference signal.

The laser sensor module may be adapted to provide a defined velocity distribution of the group of particles comprising the particle relative to the first focus region. The defined velocity distribution may, for example, be provided by means of a fan. The fan may, for example, blow gas comprising the particles in a tube in order to provide the defined velocity distribution. The defined velocity distribution may alternatively or in addition be a relative velocity distribution with respect to the beam of the first laser light which may be caused by a moving mirror reflecting the first laser light.

The electrical driver may be adapted to provide a modulated first drive current to the first laser. The evaluator may be adapted to determine the first relative distance to the particle based on the first self-mixing interference signal resulting from the first modulated drive current. The modulated drive current may, for example, comprise a triangular or rectangular drive current. The first relative distance determined by means of the modulated drive current may be used in order to calculate or determine the defocus of the first self-mixing interference signal caused by the relative position of the particle with respect to the first focus region. Phase information, number of oscillations, number of relative maxima or minima, ratio of amplitudes of relative maxima minima, number of zero crossings within a defined interval of the first self-mixing interference signal, one or more distances between the zero crossings and shape of an envelope of the first self-mixing interference signal may be used in addition in order to determine the relative distance or defocus such that the size of the particle can be determined taking into account the first amplitude information. The modulated first drive current may comprise at least a first driving scheme and a second driving scheme, wherein the first driving scheme is different from the second driving scheme. Furthermore, it may be possible to use a modulated first drive current and a non-modulated first drive current in an alternating order such that different mechanisms of detecting the distance to the particle and thus the defocus can be used in order to improve accuracy.

A triangular drive current is an option to add a constant frequency to the first self-mixing interference signal. FM techniques may be used to determine the particle size which is contained in the first self-mixing interference signal as phase modulation and amplitude. Furthermore, the distance of the particle from the laser is also contained in the constant frequency provided by the triangular drive current and can be used as additional information.

With square wave modulation the two quadrature components of the particle signal can be obtained. The rectangular or square wave drive current is such that induced wavelength shift of the first laser results in a 90 degree phase shift of the backscattered light at the first laser. With the availability of the two quadrature components the maximum particle signal amplitude can always be reconstructed. A drawback of this solution may be that the signal-to-noise ratio (SNR) of the first self-mixing interference signal is 3 dB decreased as half the signal power is used to reconstruct a quadrature.

The laser sensor module may comprise a first movable minor for redirecting the first laser light. The laser sensor module may be adapted to control a movement of the first movable mirror such that detection of the size of particles below a defined size threshold can be suppressed.

The frequency bandwidth of the first self-mixing interference signal depends on the relative speed of the particle and beam of the first laser light. A higher velocity means a larger bandwidth signal, a larger bandwidth signal means less signal-to-noise ratio (SNR). The particle signal amplitude of the first self-mixing interference signal depends on the particle size. A smaller particle means smaller amplitude (when particle diameter is smaller than wavelength). By changing the relative speed such that the SNR of the small particles is below the detection limit, only the larger particles will be counted. This allows extracting from the particle count statistics as a function of minor speed particle size information. It has to be taken into account that for an increased relative speed the probed volume per time also increases and the count statistics needs to be corrected.

The laser sensor module may comprise at least a second laser and at least a second detector. The second laser may be adapted to emit second laser light. The second laser light may have a second wavelength being different from a first wavelength of the first laser light. The second detector may be adapted to determine a second self-mixing interference signal of an optical wave within a second laser cavity of the second laser. The second self-mixing interference signal is caused by second reflected laser light reentering the second laser cavity, the second reflected laser light being reflected by the particle receiving at least a part of the second laser light. The evaluator maybe adapted to refine determination of the size of the particle by determining a second relative distance between the particle and the second laser by means of the second self-mixing interference signal.

The same size of the particle will have a different signal strength response because of different wavelengths. This additional information can be combined with the distance information and the signal strength information. The difference in response for the different wavelength can be used as an additional discriminator of the particle size. The first laser and the second laser may have more or less overlapping beam profiles such that coincidence detection of the particle by means of the first laser and a second laser may be possible. Alternatively, the first laser and the second laser may have non overlapping beams and the information may be compared or analyzed by means of statistical methods.

The laser sensor module may comprise at least one first optical device for focusing the first laser light to a first focus region. The laser sensor module may further comprise at least a second laser, at least a second detector and at least one second optical device for focusing second laser light emitted by the second laser to a second focus region. The second detector may be adapted to determine a second self-mixing interference signal of an optical wave within a second laser cavity of the second laser. The second self-mixing interference signal is caused by second reflected second laser light reentering the second laser cavity, the second reflected laser light being reflected by the particle receiving at least a part of the second laser light. The evaluator may be adapted to refine determination of the size of the particle by determining a second relative distance between the particle and the second laser by means of the second self-mixing interference signal.

Size of the first and second focus region may be different (different focal lengths, different size of focus et cetera). A relative sharp first focus point may be provided by means of the first laser in combination with the first optical device and a second focus line may be provided by means of the second laser in combination with the second optical device wherein the first focus point may, for example, be arranged on the second focus line. The second focus line may be arranged along an optical axis of the second laser. A first distance between the first laser and the first focus region may be different from the second distance between the second laser and the second focus region. The first focus region may not overlap with the second focus region as described above. The first focus region may alternatively overlap with the second focus region as described above.

According to a further aspect a method of particle size detection is presented. The method comprises the steps of:

emitting first laser light by means of a first laser, receiving in a first laser cavity of the first laser first reflected laser light being reflected by a particle receiving at least a part of the first laser light, determining a first self-mixing interference signal of an optical wave within the first laser cavity of the first laser, wherein the first self-mixing interference signal is caused by the first reflected laser light reentering the first laser cavity, determining a size of the particle by determining a first relative distance between the particle and the first laser by means of the first self-mixing interference signal and by determining a first amplitude information by means of the first self-mixing interference signal.

The steps of the method are not necessarily performed in the order as presented above.

According to a further aspect a computer program product is presented. The computer program product comprises code means which can be saved on at least one memory device of the laser sensor module according to any one of claims 1 to 13 or on at least one memory device of a device comprising the laser sensor module. The code means being arranged such that the method according to claim 14 can be executed by means of at least one processing device of the laser sensor module according to any one of claims 1 to 13 or by means of at least one processing device of the device comprising the laser sensor module. The memory device or the processing device may be comprised by the laser sensor module (e.g. electrical driver, evaluator etc.) the device comprising the laser sensor module. A first memory device and/or first processing device of the device comprising the laser sensor module may interact with a second memory device and/or second processing device comprised by the laser sensor module.

It shall be understood that the laser sensor module according to any one of claims 1 to 13 and the method of claim 14 have similar and/or identical embodiments, in particular, as defined in the dependent claims.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings.

DETAILED DESCRIPTION OF EMBODIMENTS

Various embodiments of the invention will now be described by means of the Figures.

Self-mixing interference is used for detecting movement of and distance to an object. Background information about self-mixing interference is described in "Laser diode self-mixing technique for sensing applications", Giuliani, G.; Norgia, M.; Donati, S. & Bosch, T., Laser diode self-mixing technique for sensing applications, Journal of Optics A: Pure and Applied Optics, 2002, 4, S. 283-S. 294 which is incorporated by reference. Detection of movement of a fingertip relative to a sensor in an optical input device is described in detail in International Patent Application No. WO 02/37410. The disclosure regarding the detection of distance and movement in International Patent Application No. WO 02/37410 is incorporated by reference.

The principle of self-mixing interference is discussed based on the examples presented in International Patent Application No. WO 02/37410. A diode laser having a laser cavity is provided for emitting a laser, or measuring, beam. At its upper side, the device is provided with a transparent window across which an object, for example a human finger, is moved. A lens, for example, a plano-convex lens is arranged between the diode laser and the window. This lens focuses the laser beam at or near the upper side of the transparent window. If an object is present at this position, it scatters the measuring beam. A part of the radiation of the measuring beam is scattered in the direction of the illumination beam and this part is converged by the lens on the emitting surface of the laser diode and re-enters the cavity of this laser. The radiation re-entering the cavity of the diode laser induces a variation in the gain of the laser and thus in the intensity of radiation emitted by the laser, and it is this phenomenon which is termed the self-mixing effect in a diode laser.

The change in intensity of the radiation emitted by the laser can be detected by a photo diode, provided for this purpose, which diode converts the radiation variation into an electric signal, and electronic circuitry is provided for processing this electric signal.

Movement of the object relative to the measuring beam causes the radiation reflected thereby to undergo a Doppler shift. This means that the frequency of this radiation changes or that a frequency shift occurs. This frequency shift is dependent on the velocity with which the object moves and is of the order of a few kHz to MHz. The frequency-shifted radiation re-entering the laser cavity interferes with the optical wave, or radiation generated in this cavity, i.e. a self-mixing effect occurs in this cavity. Dependent on the amount of phase shift between the optical wave and the radiation re-entering the cavity, the interference will be constructive or negative, i.e. the intensity of the laser radiation is increased or decreased periodically. The frequency of the laser radiation modulation generated in this way is exactly equal to the difference between the frequency of the optical wave in the cavity and that of the Doppler-shifted radiation re-entering the cavity. The frequency difference is of the order of a few kHz to MHz and thus easy to detect. The combination of the self-mixing effect and the Doppler shift causes a variation in behavior of the laser cavity; especially its gain or light amplification varies. The impedance of the laser cavity or the intensity of the radiation emitted by the laser may, for example, be measured, and not only can the amount of movement of the object relative to the sensor (i.e. distance traveled) be evaluated, but the direction of movement can also be determined, as described in detail in International Patent Application No. WO 02/37410.

Figure 1:
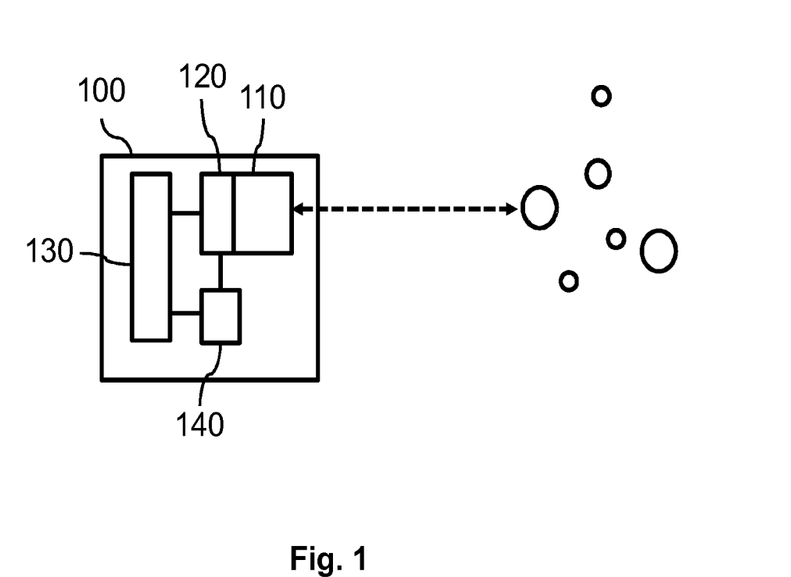
FIG. 1 shows a principal sketch of a first laser sensor module

FIG. 1 shows a principal sketch of a first laser sensor module 100. The first laser sensor module comprises a first laser 110 with an integrated first detector 120. The integrated first detector 120 is an integrated photodiode which is part of the layer structure of the first laser 110. The integrated photodiode determines oscillations of the optical wave within the first laser cavity of the first laser. The first laser sensor module 100 further comprises an electrical driver 130 and an evaluator 140. The evaluator 140 is connected to the first laser 110 or more precisely the first detector 120 and the electrical driver 130. The electrical driver 130 supplies electrical power to the first laser 110 in order to emit first laser light. The first laser 110 is in this case a vertical cavity surface emitting laser (VCSEL) with integrated photodiode. The laser sensor module 100 is connected to a power supply (not shown) which provides the power which is modulated and supplied by means of the electrical driver 130. The electrical driver 130 provides an alternating order of different modulation schemes to the first laser 110. A constant current is provided in a first modulation scheme. A driving current with a triangular modulation scheme is provided in a second modulation scheme. The triangular modulation scheme is used to determine the relative distance between the first laser 110 and the particle by means of the first self-mixing interference signal 30. The evaluator 140 receives electrical signals provided by the first detector 120 which are caused by the first self-mixing interference signal 30. The evaluator 140 further receives information regarding the driving scheme from electrical driver 130. The evaluator 140 is enabled by means of this information to determine the relative distance between the first laser 110 and the first amplitude information. Additional detectors may be provided in order to determine first laser light which is scattered by the particle at different scattering angles. The additional detector or detectors may be used to improve detection of the particle size. The scattered light for different particle size has an angular dependence. Using the additional detector in combination with first self-mixing interference signal 30 allows for improved particle size estimation by means of evaluator 140. Coincidence detection in the signal provided by the additional detector and the first self-mixing interference signal 30 may be enabled by means of evaluator 140.

Figure 2:
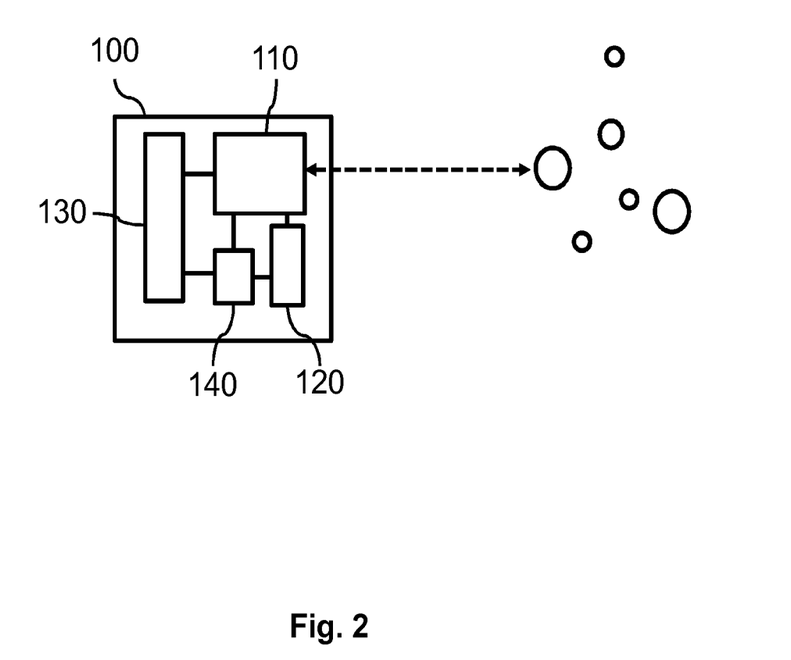
FIG. 2 shows a principal sketch of a second laser sensor module
Figure 3:
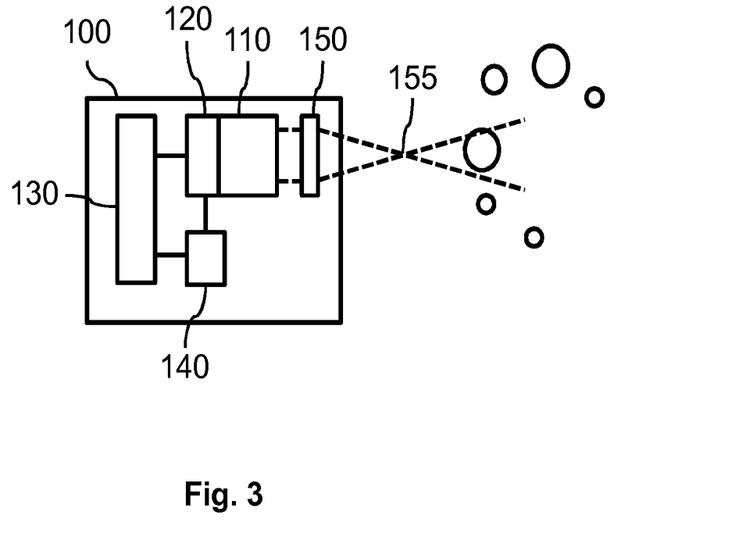
FIG. 3 shows a principal sketch of a third laser sensor module

FIG. 2 shows a principal sketch of a second laser sensor module 100. The second laser sensor module comprises a first laser 110. A second detector 120 is arranged as an external measurement circuit which determines the voltage across the first laser cavity or more generally the impedance of the first laser cavity which is influenced by the first self-mixing interference signal. The first laser sensor module 100 further comprises an electrical driver 130 and an evaluator 140. The evaluator 140 is connected to the first laser 110, the first detector 120 and the electrical driver 130. The electrical driver 130 supplies electrical power to the first laser 110 in order to emit first laser light. The first laser 110 is in this case a side emitting semiconductor laser. The laser sensor module 100 is connected to a power supply (not shown) which provides the power which is modulated and supplied by means of the electrical driver 130. The electrical driver 130 provides a constant driving current. The evaluator 140 receives electrical signals provided by the first detector 120 which are caused by the first self-mixing interference signal 30. The evaluator 140 receives information from the electrical driver 130. The evaluator 140 further receives temperature information from the first laser device. The evaluator 140 is enabled by means of this information to determine the relative distance between the first laser 110 and the first amplitude information. The particles that pass relatively far out of focus will have enough visible oscillation in the first self-mixing interference signal to determine reliable its position and hence particle size because of the constant driving current. Advantage of this modulation scheme is that it is uses the total signal power to reconstruct only one quadrature of the signal, which gives best SNR to detect the smallest particles FIG. 3 shows a principal sketch of a third laser sensor module 100. The third laser sensor module comprises a first laser 110 with an integrated first detector 120. The integrated first detector 120 is an integrated photodiode which is part of the layer structure of the first laser 110. The third laser sensor module 100 further comprises an electrical driver 130, and evaluator 140 and the first optical device 150. The evaluator 140 is connected to the first laser 110 or more precisely the first detector 120 and the electrical driver 130. The electrical driver 130 supplies electrical power to the first laser 110 in order to emit first laser light. The first laser 110 is in this case a vertical cavity surface emitting laser (VCSEL) with integrated photodiode. The laser sensor module 100 is connected to a power supply (not shown) which provides the power which is modulated and supplied by means of the electrical driver 130. The electrical driver 130 provides a constant driving current. The evaluator 140 receives electrical signals provided by the first detector 120 which are caused by the first self-mixing interference signal 30. The evaluator 140 further receives information from the electrical driver 130. The evaluator 140 is enabled by means of this information to determine the relative distance between the first laser 110 and the first amplitude information. The first laser light emitted by the first laser 110 is focused by means of the first optical device 150 to a first focus region 155. A particle can be detected within a range around the first focus region 155. The distance between the first focus region 155 and the particle is called defocus. The defocus influences the first self-mixing interference signal 30 and provides information in order to determine the relative distance between the first laser 110 and the particle. This information in combination with first amplitude information is used by means of evaluator 140 in order to determine the size of the particle.

The first optical device 150 may for example comprises only one lens with the defined diameter rlens. The first self-mixing interference signal 30 scales as $(1-\exp[-(\text{rlens}/\text{wpupil})^2])^2$, wherein wpupil is the waist parameter of a Gaussian beam of the first laser light at the lens pupil. The lens should have a certain minimal diameter in order to avoid signal loss due to vignetting of the backscattered or reflected beam of first laser light. A favorable embodiment would have a lens diameter>1.1 pupil diameter (this corresponds to 3 dB signal loss). Even better would be a lens>1.5 pupil diameter of the Gaussian beam (1 dB signal loss).

Details about the theoretical background about the determination of the size of the particle are described in the following paragraphs.

The change in power within the first laser cavity of the first laser 110 due to the back scattered or reflected first laser light from a particle can be given by the following formula.

$$\frac{\Delta P}{P} \sim E_{laser}^*(x, y, z) \frac{\lambda}{k} |E_{bs}| \cos(\varphi)$$

Delta P/P is the relative power change of the laser intensity of the optical wave within the first laser cavity due to the backscattered light from the particle, E_(laser)(x,y,z) is the laser field at the position of the particle, IE_bsl is related to backscattered light from the particle in backward direction, $\lambda$ is the wavelength, k is $2\pi/\lambda$, φ is the resulting phase between the backscattered light and the optical wave in the first laser cavity. This phase can depend non-linearly on the amplitude of the backscattered signal.

IE_bsl is given by the following formula, $$|E_{bs}| = |E_{laser}(x, y, z)| k \sqrt{\frac{d\sigma}{d\Omega}}$$

Here d sigma/d Omega is the scattering cross section of the beam of the first laser light for the backward direction. (It is here assumed constant within the acceptance angle of the laser beam).

The total expression for the signal strength becomes $$\frac{\Delta P}{P} = I_{laser}(x, y, z) \lambda \sqrt{\frac{d\sigma}{d\Omega}} \cos[\phi(x, y, z)]$$

The first part of the equation describes the amplitude of the signal and the last term its phase.

This phase is determined by the distance from the first laser 110 to the particle, and on the phase of the incident laser beam of first laser light, as is well known in interferometers. For a laser sensor module 100 using self-mixing interference with a scanning spot or moving particle in the transverse direction, especially the dependence on the transversal components of the field, x, y is interesting. For a Gaussian beam of first laser light it is given by the following equation.

$$E_{laser}(x, y, z) = E_0 \sqrt{\frac{2}{\pi w^2(z)}} e^{-\frac{(x^2+y^2)}{w^2(z)}} e^{-i(kz+\varsigma(z))} e^{-\frac{ik(x^2+y^2)}{2R(z)}}$$

The phase at z=constant plane, is determined by the amount of defocus of the beam of first laser light which can be parametrized by R(z).

$$R(z) = z \left[ 1 + \left(\frac{z_r}{z}\right)^2 \right]$$

The amplitude of the beam in a constant z plane is a Gaussian determined by its beam waist, parameterized by w(z).

$$w(z) = w_0 \sqrt{1 + \left(\frac{z}{z_r}\right)^2}$$

With z_r the Rayleigh range, $$z_r = \frac{\pi w_0^2}{\lambda}$$

The first part of the Gaussian beam gives the amplitude dependence and the part in the complex exponential the phase profile of the beam.

This Gaussian beam profile can be inserted into the equation for the laser power (also other laser beam profiles can be inserted).

This leads to $$\frac{\Delta P}{P} = I_0 \frac{2}{\pi w^2(z)} e^{-\frac{2(x^2+y^2)}{w^2(z)}} \lambda \sqrt{\frac{d\sigma}{d\Omega}} \cos\left[\left(kz + \zeta(z) + \frac{k(x^2 + y^2)}{2R(z)}\right)\right]$$

Some words on the phase term one could say that the relative z movement of particle and laser corresponds to Doppler phase shift and x,y relative movement to defocus phase shift.

When the particle trajectory with respect to the focus is known this equation describes the observed intensity oscillation of the laser. The basic unknown is $$\sqrt{\frac{d\sigma}{d\Omega}},$$

which depends on the size of particle (and its dielectric properties, however generally optical particle counters assume that the scatter cross-section $$\left(\frac{d\sigma}{d\Omega}\right)$$

correlates to particle size and assume that the dielectric properties of the different particles are the same), when all other parameters are known the back scatter cross section can be determined from the measurement signal.

Movement of the particles may be either small or predetermined particle trajectory may be provided. One option would be to use a controlled airflow. Another option is to use a scanning spot, for instance by a MEMs mirror as described in FIG. 4, together with the assumption that the particle movement is significantly smaller than the movement of the spot. The scanning spot also ensures that the relative distance between the particle and the first laser during its trajectory are known.

In the case the particle and the laser spot have well defined transversal relative velocity and the z dependence can be neglected, either by a scanning mirror which displaces the laser spot, or by a controlled air flow which displaces the particle, the phase of the backscattered light will vary due to the defocus term. This phase variation leads to oscillation of the first self-mixing interference signal 30. Apart from this phase variation also the amplitude of the beam decreases leading to a lower signal of the particle signal. As the particle goes out of focus the phase oscillating term becomes larger compared to the transversal decay ($z\_R$ is Rayleigh range).

$$\frac{k}{2R(z)} = \frac{k}{2}\frac{z}{z^2 + z_R^2} \text{(transversal exponent phase laser field)}$$

$$\frac{1}{2w^2(z)} = \frac{\frac{\pi}{\lambda}z_R}{2(z^2 + z_R^2)} \text{(transversal exponent intensity beam)}$$

$$\frac{2R(z)}{2kw^2(z)} = \frac{z_R}{2z} \text{(ratio of the two)}$$

This means that out of focus more oscillations of the particle signal are present before the first self-mixing interference signal 30 decays below the noise level. So from the amount of oscillations as function of the decay of the signal the position of the particle could be determined. The maximum signal amplitude decays as out of focus the maximal intensity of the laser beam is lower.

The important point is that considering the amplitude of the first self-mixing interference signal 30 and, for example, the amount of oscillation periods and their frequency, the distance from focus can be determined and with that information and the maximum amplitude of the first self-mixing interference signal 30 the particle size. Alternatively or in addition, the zero crossings of the first self-mixing interference signal 30 and the distance between the zero crossings may be used. Furthermore, an envelope of the first self-mixing interference signal 30 may be modelled and the distance may be determined by means of the maximum and/or minimum of the envelope and the decay of the envelope as long as the envelope is above the noise level of the first self-mixing interference signal 30.

Figure 4:
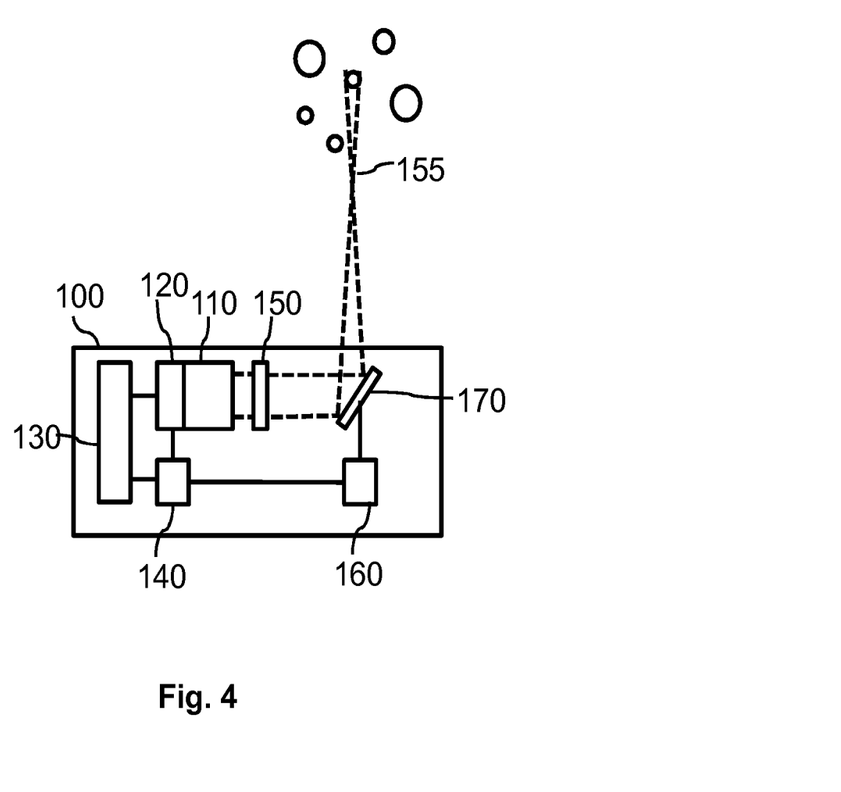
FIG. 4 shows a principal sketch of a fourth laser sensor module

FIG. 4 shows a principal sketch of a fourth laser sensor module 100. The fourth laser sensor module comprises a first laser 110 with an integrated first detector 120. The fourth laser sensor module 100 further comprises an electrical driver 130, and evaluator 140, a first optical device 150, a movable mirror 170 and a controller 160 for controlling the movable minor 170. The evaluator 140 is connected to the first detector 120, the electrical driver 130 and the controller 160. The electrical driver 130 supplies electrical power to the first laser 110 in order to emit first laser light. Electrical driver 130 provides a modulated driving current (rectangular drive current). The evaluator 140 receives electrical signals provided by the first detector 120 which are caused by the first self-mixing interference signal 30. The evaluator 140 further receives information from the electrical driver 130 and the controller 160 in order to interpret the first self-mixing interference signal 30 measured by the first detector 120. The information provided by the electrical driver 130 may comprise the current amplitude provided at a determined moment in time. The information provided by controller 160 may comprise angular velocity, amplitude of mirror movement and the like. The evaluator 140 is enabled by means of this information to determine the relative distance between the first laser 110 and the first amplitude information as described in detail above. The first laser light emitted by the first laser 110 is focused by means of the first optical device 150 to a first focus region 155 which moves along a scanning direction 175 (see, for example, FIG. 5) because of movable mirror 170. A particle can be detected within a range around the first focus region 155. The distance between the first focus region 155 and the particle is called defocus. The defocus influences the first self-mixing interference signal 30 and provides information in order to determine the relative distance between the first laser 110 and the particle as described above. This information in combination with first amplitude information is used by means of evaluator 140 in order to determine the size of the particle as described above.

The particle signal amplitude of the first self-mixing interference signal 30 is an interplay between the numerical aperture of the focused spot (or beam waist of the Gaussian beam) and the mirror movement of movable mirror 170. First the minimal particle size to be detected should be determined. This poses a limit to the maximal noise power that after filtering can be present in the first self-mixing interference signal 30. As discussed above the relative velocity of spot and particle determines the frequency bandwidth of signal. When the velocity is low the sampled air volume is low, an increase in velocity leads to more sampled volume and hence to more detected particles. The SNR also decreases for larger velocity, but this is unimportant as long as the smallest desired particle is still detectable. The shape of the laser beam also has influence on the sampled air volume; a Gaussian beam with a large waist has a larger diameter and Rayleigh range, yielding more Cross-sectional area than a beam with a small waist (higher numerical aperture). A larger waist also means lower scattered signal as local intensity is lower. This means that a trade of exist between the numerical aperture of the lens used to focus the beam and the relative speed.

In case the air movement is not controlled, and a scanning mirror is used to displace the spot. It may be favorable to choose the velocity higher than normal air speed velocities, 0.1 to 1 m/s. So it would be convenient to have a value of 5-20 m/s. In that case a value of the numerical aperture of the focusing lens of between 0.05-0.2 would be optimal, when particles above 300 nm should be detectable. (numerical aperture is defined using the $1/e^2$ intensity value of the Gaussian beam's far field angular extend).

Figure 5:
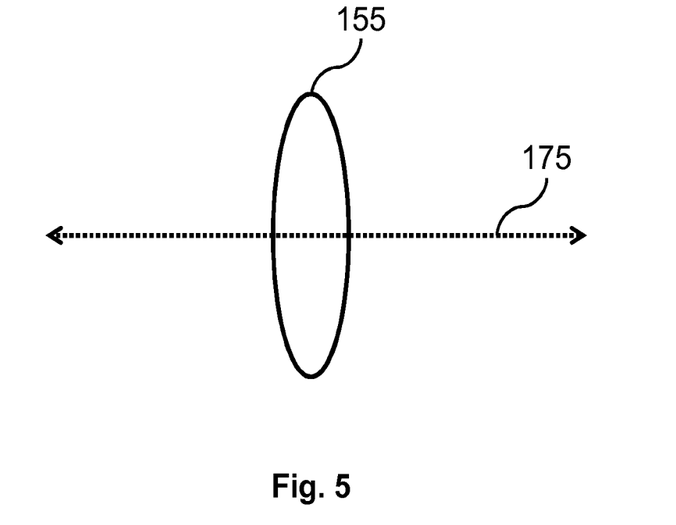
FIG. 5 shows a principal sketch of a first focus region

FIG. 5 shows a principal sketch of a cross-section of a first focus region 155 which moves across a scanning direction 175 due to the movable mirror 170 as described in FIG. 4. The cross-section shows an elliptical focus. By making an elliptical spot in focus, the sensitivity to defocus can be made largest along the short axis of the ellipse. It may thus be preferred to arrange scanning direction 175 parallel to the short axis of the ellipse. This spot shape can be made with an anamorphic prism pair, or by using a cylindrical lens or by using, for example, a VCSEL with an elliptical mode profile.

Figure 6:
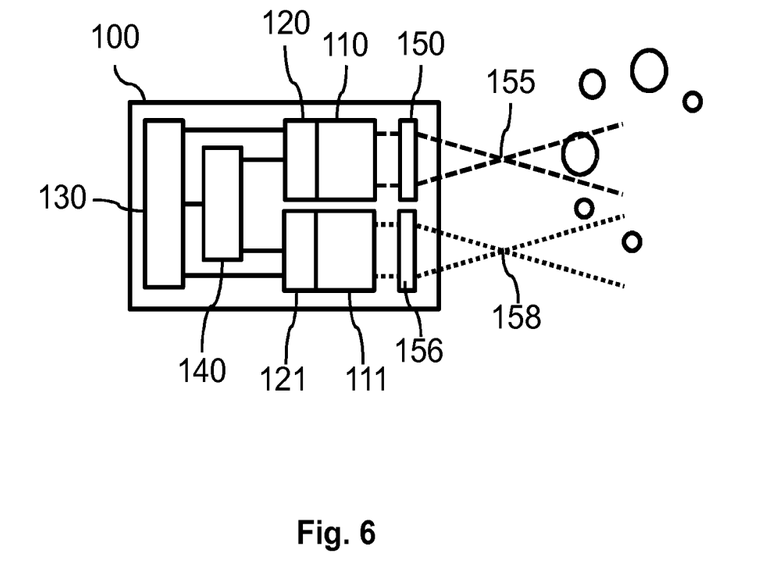
FIG. 6 shows a principal sketch of a fifth laser sensor module

FIG. 6 shows a principal sketch of a fifth laser sensor module 100. The fifth laser sensor module 100 comprises a first laser 110 with an integrated first detector 120 and a second laser 111 with an integrated second detector 121. The first laser 110 emits first laser light with a first wavelengths, the second laser 111 emits second laser light with a second wavelength. The second wavelength is different as the first wavelengths. The fifth laser sensor module 100 comprises an electrical driver 130 which is adapted to provide a drive current to the first laser 110 and to the second laser 111. The fifth laser sensor module 100 may comprise in an alternative embodiment of further electrical driver 130 for electrically driving second laser 121. The third laser sensor module further comprises an evaluator 140. The evaluator 140 is connected to the first laser 110, the second laser 111 and the electrical driver 130. The fifth laser sensor module 100 further comprises a first optical device 150 for focusing the first laser light to a first focus region 155. The fifth laser sensor module 100 further comprises a second optical device 156 for focusing the second laser light to a second focus region 158. The evaluator 140 receives electrical signals provided by the first detector 120 which are caused by the first self-mixing interference signal 30, and electrical signals provided by the second detector 121 which are caused by second self-mixing interference signal. The evaluator 140 further receives information from the electrical driver 130. The evaluator 140 is enabled by means of this information to determine the relative distance between the first laser 110 and the first amplitude information. The evaluator 140 is further enabled by means of this information to determine the relative distance between the second laser 111 and second amplitude information. The size of the particle can be determined by means of this information independently from the first self-mixing interference signal 30. The evaluator 140 is further adapted to evaluate the first self-mixing interference signal 30 and the second self-mixing interference signal by means of statistical analysis based on the theoretical model of particle movement or based on information about particle movement which may be induced for example by a fan within a tube which is either transparent with respect to first and second laser light or which may have a window (not shown).

Figure 7:
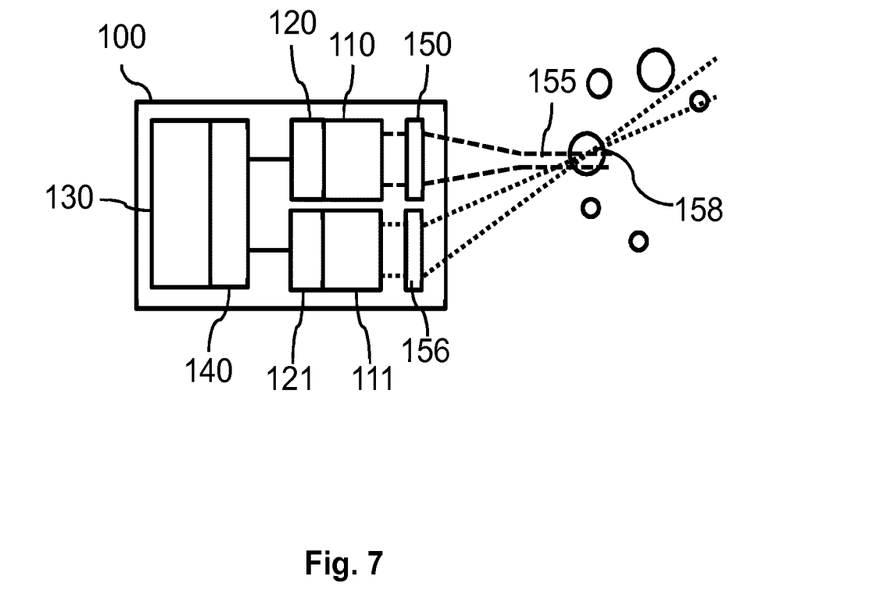
FIG. 7 shows a principal sketch of a sixth laser sensor module

FIG. 7 shows a principal sketch of a sixth laser sensor module 100. The sixth laser sensor module 100 comprises a first laser 110 with an integrated first detector 120 and a second laser 111 with an integrated second detector 121. The first laser 110 and the second laser 111 emit first and second laser light with the same wavelength. The sixth laser sensor module 100 comprises an electrical driver 130 which is adapted to provide a drive current to the first laser 110 and to the second laser 111. The electrical driver comprises an evaluator 140 which is connected to the first laser 110 and the second laser 111. The sixth laser sensor module 100 further comprises a first optical device 150 for focusing the first laser light to a first focus region 155. The sixth laser sensor module 100 further comprises a second optical device 156 for focusing the second laser light to the second focus region 158. The first focus region 155 extends along an optical axis of the first laser 110 and the first optical device 150 and provides therefore nearly constant feedback to the first laser 110 within the first focus region 155. The second focus region 158 comprises a sharp focus point. The first focus region 155 overlaps with the second focus region 158. The evaluator 140 receives electrical signals provided by the first detector 120 which are caused by the first self-mixing interference signal 30, and electrical signals provided by the second detector 121 which are caused by second self-mixing interference signal. The evaluator 140 further receives information from the electrical driver 130. The evaluator 140 is enabled by means of this information to determine the relative distance between the first laser 110 and the first amplitude information. The evaluator 140 is further enabled by means of this information to determine the relative distance between the second laser 111 and second amplitude information. The size of the particle can be determined by means of this information independently from the first self-mixing interference signal 30. The line focus or first focus region 155 of the first laser 110, gives more or less the same first self-mixing interference signal 30 along the optical axis of the first laser 110 and first optical device 150. From the second self-mixing interference signal the position out of focus can be determined and hence it can be deduced by means of an evaluator 140 whether the first self-mixing interference signal 30 stems from the constant first focus region 155.

Figure 8:
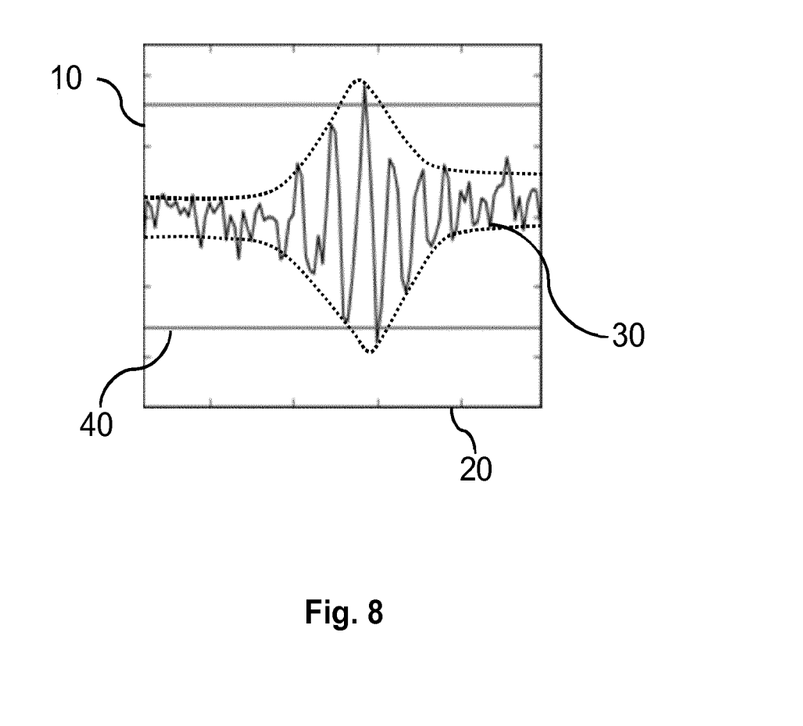
FIG. 8 shows a first embodiment of the first self-mixing interference signal
Figure 9:
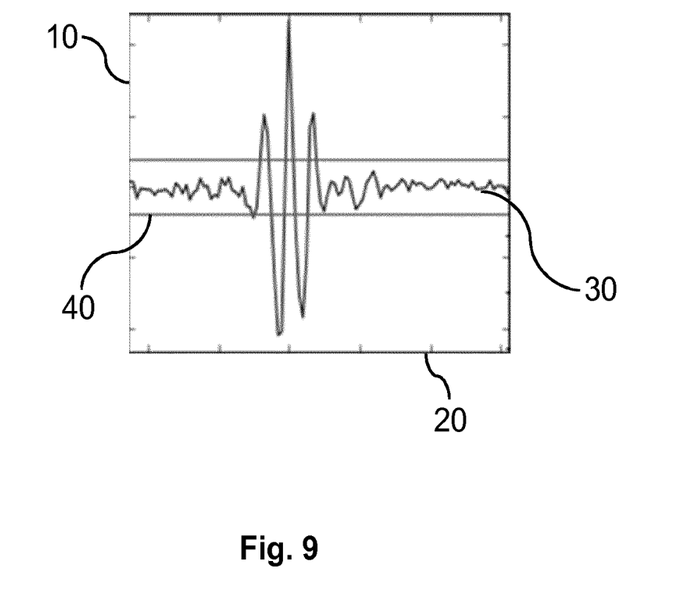
FIG. 9 shows a second embodiment of the first self-mixing interference signal

FIG. 8 shows a first embodiment of the first self-mixing interference signal 30. The measured first self-mixing interference signal 30 of a 600 nm particle is presented. The vertical axis shows the amplitude axis 10 and the horizontal axis shows the time axis 20. The particle has passed far from focus which causes a rather low amplitude first self-mixing interference signal 30. In contrast to this the amplitude of the first self-mixing interference signal shown in FIG. 9 is high because the particle has been measured in or near to the focus of the first optical device. The number of oscillations within the predetermined time range of 0.02 ms around the maximum (or minimum) amplitude in FIG. 8 is higher in comparison to the number of oscillations within the same time range around the maximum or minimum amplitude in FIG. 9. Furthermore, the amplitudes relative maxima of the first self-mixing interference signal 30 in FIG. 8 decay slowly comparison to FIG. 9. In practice the noise will set a detection threshold above which a particle signal will be discriminated. The size of the particle mainly influences the amplitude of the first self-mixing interference signal 30 and the amount of defocus will mainly determine its extend in time. When the signal would be normalized then the same amount out of focus would result in the same signal shape apart from an arbitrary phase factor (and correction terms when particle size cannot be neglected with respect to laser beam size). Some ambiguity in relating the amplitude to a particle size will remain due to possible offset perpendicular to the optical axis of the first laser 110 and first optical device 150 (y direction when scanning of beam is in the x direction), but an average particle size can be determined. Such ambiguities may be reduced by using an independent detector at different scattering angle or by using, two, three or more lasers 110, 111 with corresponding detectors 120, 121.

Figure 10:
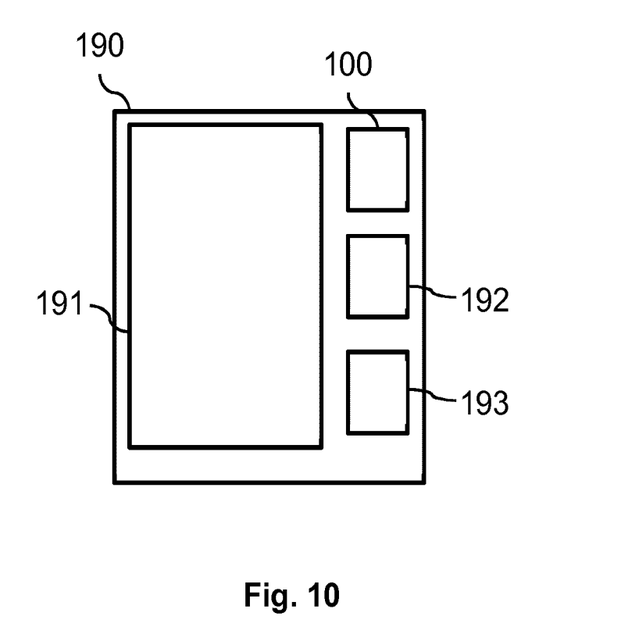
FIG. 10 shows a mobile communication device comprising a laser sensor module

FIG. 10 shows a mobile communication device 190 comprising a laser sensor module 100. The mobile communication device 190 comprises a user interface 191, a processing device 192 and a main memory device 193. The main processing device 192 is connected with the main memory device 193 and with laser sensor module 100. The main processing device 192 comprises at least a part of the functionalities of evaluator 140 which are described above. The main processing device 192 stores data related to particle detection in the main memory device 193. In an alternative embodiment it may also be possible that the main processing device 192 and the main memory device 193 are only used to prepare or adapt data provided by means of the laser sensor module 100 such that the data can be presented to a user of the mobile communication device 190 by means of user interface 191. The laser sensor module 100 is powered by means of power supply mobile communication device 190.

Figure 11:
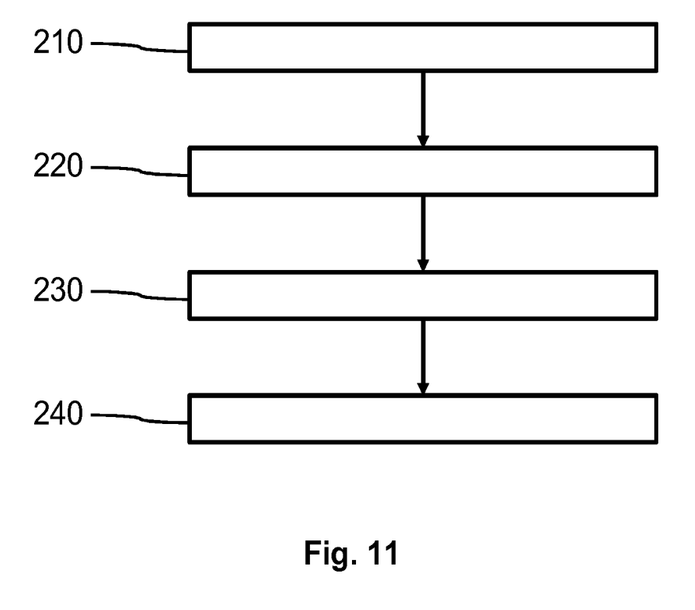
FIG. 11 shows a principal sketch of a method of detecting the particle size In the Figures, like numbers refer to like objects throughout. Objects in the Figures are not necessarily drawn to scale.

FIG. 11 shows a principal sketch of a method of detecting the particle size. In step 210 is first laser light emitted by means of a first laser 110. In step 220 first reflected laser light which is reflected by a particle receiving at least a part of the first laser light is reflected in a first laser cavity of the first laser 110. A first self-mixing interference signal 30 of an optical wave within the first laser cavity of the first laser 110 is detected in step 230. The first self-mixing interference signal 30 is caused by the first reflected laser light reentering the first laser cavity. A size of the particle is determined in step 240 by determining a first relative distance between the particle and the first laser 110 by means of the first self-mixing interference signal 30 and by determining a first amplitude information by means of the first self-mixing interference signal 30.

It is a basic idea of the present invention to use distance and amplitude information of self-mixing interference signals to determine a size of the particle. Especially the shape of the self-mixing interference signal within a defined period around a maximum or minimum of the self-mixing interference signal provides information which can be used to determine particle size.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 10 amplitude axis
20 time axis
30 first self-mixing interference signal
40 amplitude reference
100 laser sensor module
110 first laser
111 second laser
120 first detector
121 second detector
130 electrical driver
140 evaluator
150 first optical device
155 first focus region
156 second optical device
158 second focus region
160 controller
170 movable mirror
175 scanning direction
190 mobile communication device
191 user interface
192 main processing device
193 main memory device
210 step of emitting first laser light
220 step of receiving first reflected laser light
230 step of determining a first self-mixing interference signal
240 determining size of the particle

The invention claimed is:

1. A laser sensor module comprising:
   at least one first laser;
   at least one first detector;
   at least one electrical driver; and
   at least one evaluator,
   wherein the first laser is arranged to emit first laser light in reaction to signals provided by the at least one driver,
   wherein the at least one first detector is arranged to determine a first self-mixing interference signal of an optical wave within a first laser cavity of the first laser,
   wherein the first self-mixing interference signal is caused by first reflected laser light reentering the first laser cavity,
   wherein the first reflected laser light is reflected by a particle receiving at least a part of the first laser light,
   wherein the evaluator is arranged to determine a size of the particle by determining a first relative distance between the particle and the first laser using the first self-mixing interference signal and by determining a first amplitude information using the first self-mixing interference signal,
   wherein the laser module further comprises at least one first focus region,
   wherein the first relative distance is related to a distance between the first focus region and the particle,
   wherein the evaluator is arranged to determine the first relative distance based on at least one characteristic of the first self-mixing interference signal,
   wherein the first self-mixing interference signal is related to the distance between the first focus region and the particle,
   wherein the first amplitude information comprises a maximum or a minimum amplitude of the first self-mixing interference signal,
   wherein the at least one characteristic of the first self-mixing interference signal comprises at least one of phase information, number of oscillations, number of relative maxima or minima, ratio of amplitudes of relative maxima minima, number of zero crossings within a defined interval of the first self-mixing interference signal, one or more distances between the zero crossings and shape of an envelope of the first self-mixing interference signal.

2. The laser sensor module according to claim 1, wherein the laser module further comprises at least one first optical device for focusing the first laser light on the first focus region.

3. The laser sensor module according to claim 1,
   wherein the evaluator is arranged to determine an absolute maximum or minimum of a first signal amplitude of the first self-mixing interference signal,
   wherein the evaluator is arranged to determine a first number of relative maxima or minima of the first self-mixing interference signal within a defined range around the absolute maximum or minimum of the first self-mixing interference signal,
   wherein the evaluator is arranged to determine the first relative distance to the particle using the number of maxima or minima of the first self-mixing interference signal within the defined range,
   wherein the evaluator is arranged to determine the size of the particle using the determined first relative distance to the particle and the absolute maximum or minimum of the first signal amplitude of the first self-mixing interference signal.

4. The laser sensor module according to claim 3,
   wherein the evaluator is arranged to refine the determination of the first relative distance to the particle based on the ratio between the absolute maximum of the first signal amplitude of the first self-mixing interference signal and an amplitude of the first self-mixing interference signal at at least one of the relative maxima of the first self-mixing interference signal, or based on the ratio between the absolute minimum of the first signal amplitude of the first self-mixing interference signal and an amplitude of the first self-mixing interference signal at at least one of the relative minima of the first self-mixing interference signal.

5. The laser sensor module according to claim 1, wherein the laser sensor module is arranged to provide a defined velocity distribution of the group of particles comprising the particle relative to the first focus region.

6. The laser sensor module according to claim 1,
wherein the electrical driver is arranged to provide a first modulated drive current to the first laser,
wherein the evaluator is arranged to determine the first relative distance to the particle based on the first self-mixing interference signal resulting from the first modulated drive current.

7. The laser sensor module according to claim 6,
wherein the first modulated drive current comprises at least a first driving scheme and a second driving scheme,
wherein the first driving scheme is different from the second driving scheme.

8. The laser sensor module according to claim 1,
wherein the laser sensor module further comprises a first movable mirror (170) for redirecting the first laser light,
wherein the laser sensor module is arranged to control a movement of the first movable mirror such that detection of the size of particles below a defined size threshold is suppressed.

9. The laser sensor module according to claim 1, further comprising:
at least a second laser; and
at least a second detector,
wherein the second laser is arranged to emit second laser light,
wherein the second laser light has a second wavelength being different from a first wavelength of the first laser light,
wherein the second detector is arranged to determine a second self-mixing interference signal of an optical wave within a second laser cavity of the second laser,
wherein the second self-mixing interference signal is caused by second reflected laser light reentering the second laser cavity,
wherein the second reflected laser light is reflected by the particle receiving at least a part of the second laser light,
wherein the evaluator is arranged to refine determination of the size of the particle by determining a second relative distance between the particle and the second laser using the second self-mixing interference signal.

10. The laser sensor module according to claim 1, further comprising:
at least one first optical device, wherein the first optical device is arranged to focus the first laser light on a first focus region;
at least a second laser;
at least a second detector; and
at least one second optical device, wherein the second optical device is arranged for focusing second laser light emitted by the second laser on a second focus region,
wherein the second detector is arranged to determine a second self-mixing interference signal of an optical wave within a second laser cavity of the second laser,
wherein the second self-mixing interference signal is caused by second reflected second laser light reentering the second laser cavity,
wherein the second reflected laser light is reflected by the particle receiving at least a part of the second laser light,
wherein the evaluator is arranged to refine determination of the size of the particle by determining a second relative distance between the particle and the second laser using the second self-mixing interference signal.

11. The laser sensor module according to claim 10, wherein a first size of the first focus region is different than a second size of the second focus region.

12. A mobile communication device comprising a particle detector, the particle detector comprising at least one laser sensor module according to claim 1.

13. A method of particle size detection for determining an air quality, the method comprising the steps of:
emitting a first laser light using a first laser, wherein the first laser light illuminates to at least one first focus region,
receiving first reflected laser light in a first laser cavity of the first laser, wherein the first reflected laser light is reflected by a particle receiving at least a part of the first laser light,
determining a first self-mixing interference signal of an optical wave within the first laser cavity of the first laser, wherein the first self-mixing interference signal is caused by the first reflected laser light reentering the first laser cavity,
determining a size of the particle by determining a first relative distance between the particle and the first laser using the first self-mixing interference signal and by determining a first amplitude information using the first self-mixing interference signal, wherein the first relative distance is related to a distance between the first focus region and the particle,
determining the first relative distance based on at least one characteristic of the first self-mixing interference signal,
wherein the first self-mixing interference signal is related to the distance between the first focus region and the particle,
wherein the first amplitude information comprises a maximum or minimum amplitude of the first self-mixing interference signal, and
wherein the at least one characteristic of the first self-mixing interference signal is related to the distance between the first focus region and the particle comprises at least one of phase information, number of oscillations, number of relative maxima or minima, ratio of amplitudes of relative maxima minima, number of zero crossings within a defined interval of the first self-mixing interference signal, one or more distances between the zero crossings and shape of an envelope of the first self-mixing interference signal.

14. A computer program product comprising code, wherein the code is arranged such that the method according to claim 13 can be executed using a processing circuit.

15. The method according to claim 13, wherein the method further comprises focusing the first laser light on the first focus region.

16. The method according to claim 13 further comprising:
determining an absolute maximum or minimum of a first signal amplitude of the first self-mixing interference signal;

determining a first number of relative maxima or minima of the first self-mixing interference signal within a defined range around the absolute maximum or minimum of the first self-mixing interference signal;

determining the first relative distance to the particle using the number of maxima or minima of the first self-mixing interference signal within the defined range;

determining the size of the particle using the determined first relative distance to the particle and the absolute maximum or minimum of the first signal amplitude of the first self-mixing interference signal.

17. The method according to claim 16 further comprising refining the determination of the first relative distance to the particle based on the ratio between the absolute maximum of the first signal amplitude of the first self-mixing interference signal and an amplitude of the first self-mixing interference signal at at least one of the relative maxima of the first self-mixing interference signal, or based on the ratio between the absolute minimum of the first signal amplitude of the first self-mixing interference signal and an amplitude of the first self-mixing interference signal at least one of the relative minima of the first self-mixing interference signal.

18. The method according to claim 13 further comprising, providing a defined velocity distribution of the group of particles comprising the particle relative to the first focus region.

19. The method according to claim 13 further comprising:
providing a first modulated drive current to the first laser; and
determining the first relative distance to the particle based on the first self-mixing interference signal resulting from the first modulated drive current.

20. The method according to claim 19,
wherein the modulated first drive current comprises at least a first driving scheme and a second driving scheme,
wherein the first driving scheme is different from the second driving scheme.

* * * * *